US010699225B2

(12) United States Patent
Sang et al.

(10) Patent No.: US 10,699,225 B2
(45) Date of Patent: Jun. 30, 2020

(54) PRODUCTION MANAGEMENT SUPPORT APPARATUS, PRODUCTION MANAGEMENT SUPPORT METHOD, AND PRODUCTION MANAGEMENT SUPPORT PROGRAM

(71) Applicant: Hitachi, Ltd., Chiyoda-ku, Tokyo (JP)

(72) Inventors: Xiaolin Sang, Tokyo (JP); Motonobu Saito, Tokyo (JP); Yuji Kakutani, Tokyo (JP); Yuuichi Suginishi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 316 days.

(21) Appl. No.: 15/714,687

(22) Filed: Sep. 25, 2017

(65) Prior Publication Data
US 2018/0174090 A1 Jun. 21, 2018

(30) Foreign Application Priority Data
Dec. 15, 2016 (JP) .................................. 2016-243608

(51) Int. Cl.
*G06Q 10/06* (2012.01)
*G06N 3/04* (2006.01)
*G06N 3/08* (2006.01)

(52) U.S. Cl.
CPC ... *G06Q 10/063114* (2013.01); *G06N 3/0436* (2013.01); *G06Q 10/067* (2013.01); *G06N 3/08* (2013.01)

(58) Field of Classification Search
CPC .............................. G06Q 10/00; G06Q 40/00
(Continued)

(56) References Cited

U.S. PATENT DOCUMENTS 6,026,370 A * 2/2000 Jermyn ................ G06Q 20/202
235/375
6,134,530 A * 10/2000 Bunting ................ G06Q 10/06
705/7.25

(Continued)

FOREIGN PATENT DOCUMENTS

JP 2007-133664 A 5/2007
JP 2013-235566 A 11/2013

(Continued)

OTHER PUBLICATIONS

Anat et al "Who Counts as Employed" Informal Wwork, Employment Status, Labor Market Slack, Federal Reserve, Bank, 2016, pp. 1-30 (Year: 2016).*

*Primary Examiner* — Romain Jeanty
(74) *Attorney, Agent, or Firm* — Corwell & Moring LLP

(57) ABSTRACT

A CPU 501 of a production management support apparatus 500 is configured to execute: a process of acquiring capability information of a plurality of workers; a process of acquiring work information of a plurality of kinds of work; a process of acquiring work performance information including a work status of a plurality of kinds of work actually executed by the plurality of workers; a process of accepting a designation of a target worker and target work; a process of acquiring the work performance information of the plurality of workers related to the plurality of kinds of work, and generating a predictive model which adopts a work status in the work performance information of each work as a target variable, and which adopts any plurality of feature amounts among feature amounts included in the work information and the capability information as an explanatory variable; a process of applying the predictive model to the capability information of the target worker and the work information of the target work, to estimate a work (Continued)

status when the target work is performed by the target worker; and a process of displaying the estimated work status.

13 Claims, 7 Drawing Sheets

(58) Field of Classification Search
USPC .......................................................... 705/7.15
See application file for complete search history.

(56) References Cited

U.S. PATENT DOCUMENTS

| | | | |
|---|---|---|---|
| 6,732,079 B1* | 5/2004 | Kintner | G06Q 10/06311 705/7.13 |
| 7,155,400 B1* | 12/2006 | Jilk | G06Q 10/06 705/7.14 |
| 8,224,472 B1* | 7/2012 | Maluf | G06Q 10/06 700/97 |
| 8,380,551 B2* | 2/2013 | Coffman | G06Q 10/06 705/7.12 |
| 10,467,564 B2* | 11/2019 | Hull | G06Q 10/063114 |
| 2002/0128892 A1* | 9/2002 | Farenden | G06Q 10/063112 705/7.14 |
| 2011/0295643 A1* | 12/2011 | Miller | G06Q 10/06 705/7.23 |
| 2014/0222485 A1* | 8/2014 | Cantor | G06Q 10/06 705/7.22 |
| 2015/0161555 A1 | 6/2015 | Cui et al. | |

FOREIGN PATENT DOCUMENTS

WO     WO 2014/188524 A1    11/2014
WO     WO-2015128790 A1 *   9/2015 ............. G06Q 10/06

* cited by examiner

Fig. 2

| Process information management DB 260 | | | | | | | | | | | | |
|---|---|---|---|---|---|---|---|---|---|---|---|---|
| Work ID 260a | Work name 260b | Processing method 260c | Required accuracy 260d | Size 260e | Weight 260f | Processing area 260g | Level of complexity 260h | Operation 1 260i1 | Number of times of operation 1 260i2 | Operation 2 260i3 | Number of times of operation 2 260i4 | ... |
| W001 | Work 1 | Process A | IT2 | 4.18 | 11.2 | 7.11 | 2 | Operation A | 10 | Operation B | 3 | ... |
| W002 | Work 2 | Process B | IT4 | 7.32 | 45.0 | 7.26 | 3 | Operation B | 2 | Operation C | 15 | ... |
| W003 | Work 3 | Process C | IT10 | 10.19 | 61.2 | 19.11 | 1 | Operation A | 30 | Operation D | 10 | ... |
| W004 | Work 4 | Process A | IT1 | 2.16 | 9.8 | 1.09 | 4 | Operation E | 25 | Operation F | 1 | ... |
| W005 | Work 5 | Process C | IT7 | 4.77 | 20.3 | 5.59 | 1 | Operation A | 5 | Operation B | 10 | ... |
| : | : | : | : | : | : | : | : | : | : | : | : | : |

Fig. 3

| Worker information management DB 360 | | | | | | | | | | | | |
|---|---|---|---|---|---|---|---|---|---|---|---|---|
| Modification date 360a | Worker ID 360b | Worker name 360c | Age 360d | Gender 360e | Skill 1 level 360f1 | Years of skill 1 experience 360f2 | Skill 2 level 360f3 | Years of skill 2 experience 360f4 | ... | Qualification 1 360g1 | Qualification 2 360g2 | ... |
| 2016/01/20 | 0001 | FT | 21 | Male | 2 | 1 | 0 | 0 | ... | × | × | ... |
| 2016/03/04 | 0002 | AY | 25 | Female | 3 | 4 | 2 | 3 | ... | ○ | × | ... |
| 2016/06/01 | 0003 | KI | 30 | Male | 4 | 6 | 5 | 8 | ... | ○ | ○ | ... |
| : | : | : | : | : | : | : | : | : | ... | : | : | ... |
| 2015/06/08 | 0001 | FT | 21 | Male | 1 | 1 | 0 | 0 | ... | × | × | ... |
| : | : | : | : | : | : | : | : | : | | : | : | : |

Fig. 4

| Work performance information management DB 460 | | | | |
|---|---|---|---|---|
| Work ID 460a | Worker ID 460b | Work start time 460c | Work end time 460d | Acceptance determination 460e |
| W001 | 0001 | 2016/09/01 10:00:00 | 2016/09/01 10:32:34 | ○ |
| W001 | 0001 | 2016/09/01 10:33:02 | 2016/09/01 11:10:34 | ○ |
| W001 | 0002 | 2016/09/01 10:01:32 | 2016/09/01 10:35:49 | ○ |
| W002 | 0001 | 2016/09/01 13:20:59 | 2016/09/01 16:10:33 | × |
| W002 | 0003 | 2016/09/01 13:19:21 | 2016/09/01 16:01:12 | ○ |
| : | : | : | : | : |

Fig. 5

| Feature amount table 670 ||||||||||||||
|---|---|---|---|---|---|---|---|---|---|---|---|---|
| Work ID 670a | Work name 670b | Worker ID 670c | Worker name 670d | Work time 670e | Failure occurrence rate 670f | Start date 670g | Processing method 670h | Required accuracy 670i | Size 670j | Weight 670k | Processing area 670l | Level of complexity 670m |
| W001 | Work 1 | 0001 | FT | 2.50 h | 1.2% | 2016/01/20 | Process A | IT2 | 4.18 | 11.2 | 7.11 | 2 |
| W001 | Work 1 | 0001 | FT | 2.42 h | 1.0% | 2016/06/08 | Process A | IT2 | 4.18 | 11.2 | 7.11 | 2 |
| W001 | Work 1 | 0002 | AY | 2.29 h | 0.8% | 2016/03/04 | Process A | IT2 | 4.18 | 11.2 | 7.11 | 2 |
| W002 | Work 2 | 0002 | AY | 4.66 h | 0.7% | 2016/03/04 | Process B | IT4 | 7.32 | 45.0 | 7.26 | 3 |
| W002 | Work 2 | 0003 | KI | 4.21 h | 0.8% | 2015/06/01 | Process B | IT4 | 7.32 | 45.0 | 7.26 | 3 |
| : | : | : | : | : | : | : | : | : | : | : | : | : |

| Feature amount table 670 |||||||||||||||
|---|---|---|---|---|---|---|---|---|---|---|---|---|---|---|
| Operation 1 670n1 | Number of times of operation 1 670n2 | Operation 2 670n3 | Number of times of operation 2 670n4 | ... | Age 670o | Gender 670p | Skill 1 level 670q1 | Years of skill 1 experience 670q2 | Skill 2 level 670q3 | Years of skill 2 experience 670q4 | ... | Qualification 1 670r1 | Qualification 2 670r2 | ... |
| Operation A | 10 | Operation B | 3 | ... | 21 | Male | 1 | 1 | 0 | 0 | ... | × | × | ... |
| Operation A | 10 | Operation B | 3 | ... | 21 | Male | 2 | 1 | 0 | 0 | ... | × | × | ... |
| Operation A | 10 | Operation B | 3 | ... | 25 | Female | 3 | 4 | 2 | 3 | ... | ○ | × | ... |
| Operation B | 2 | Operation C | 15 | ... | 25 | Female | 3 | 4 | 2 | 3 | ... | ○ | : | ... |
| Operation B | 2 | Operation C | 15 | ... | 30 | Male | 4 | 6 | 5 | 8 | ... | ○ | ○ | ... |
| : | : | : | : | : | : | : | : | : | : | : | : | : | : | : |

Fig. 6

| Standard work time/failure occurrence rate DB 560 ||||||||||| 
|---|---|---|---|---|---|---|---|---|---|---|
| Work ID 560a | Work name 560b | Worker ID 560c | Worker name 560d | Estimated work time 560e | Estimated failure occurrence rate 560f | Similar work ID 560g | Work similarity 560h | Similar worker ID 560i | Worker similarity 560j | Similar worker history update date 560k |
| W010 | Work H | 0020 | TO | 2.16 h | 0.4% | W001 | 0.92 | 0012 | 0.87 | 2016/01/20 |
| W010 | Work H | 0021 | ER | 2.24 h | 0.6% | W003 | 0.95 | 0008 | 0.81 | 2014/10/27 |
| W011 | Work I | 0020 | TO | 3.69 h | 0.3% | W005 | 0.88 | 0003 | 0.97 | 2015/04/09 |
| : | : | : | : | : | : | : | : | : | : | : |

Fig. 7

Standard work time/failure occurrence rate estimation

Select target work and target worker for estimating standard work time/failure occurrence rate.

710 ☐ Select all

| Target work | Target work ID |
|---|---|
| Work X | W010 |
| Work Y | W011 |
| : | : |

720 ☐ Select all

| Target worker | Target worker ID |
|---|---|
| TO | 0020 |
| ER | 0021 |
| : | : |

730 (Execute estimation)

740 (Estimation result)
List of estimation results of estimated work time and estimated failure occurrence rate with respect to combinations of target work and target worker

| Work ID | Work name | Worker ID | Worker name | Estimated work time | Estimated failure occurrence rate |
|---|---|---|---|---|---|
| W010 | Work H | 0020 | TO | 2.16 h | 0.4% |
| W010 | Work H | 0021 | ER | 2.24 h | 0.6% |
| W011 | Work I | 0020 | TO | 3.69 h | 0.3% |
| : | : | : | : | : | : |

Fig. 8

Worker candidate recommendation

After inputting target work and constraint, press worker candidate recommendation execution button.

Target work: Work X  810

Constraints: 820
- Work time ≤ 2.5 h
- Failure occurrence rate ≤ 3.0%
- Work time + failure occurrence rate *2 ≤ 7

Scatter diagram 830
(Estimated failure occurrence rate (%) vs Estimated work time (h))

840 (Add constraint)
850 (Reflect constraint)
860 (Execute worker candidate recommendation)

870 (Worker candidate list)

| Worker ID | Worker name | Estimated work time | Estimated failure occurrence rate | Recomm-endation level | Allocated work | | |
|---|---|---|---|---|---|---|---|
| 0020 | TO | 2.16 h | 0.4% | 4.04 | Work A | Allocate | Confirm details |
| 0021 | ER | 2.24 h | 0.6% | 3.56 | None | Allocate | Confirm details |
| 0022 | NH | 2.88 h | 1.0% | 2.12 | None | Allocate | Confirm details |

880  890

PRODUCTION MANAGEMENT SUPPORT APPARATUS, PRODUCTION MANAGEMENT SUPPORT METHOD, AND PRODUCTION MANAGEMENT SUPPORT PROGRAM

BACKGROUND

The present invention relates to a production management support apparatus and the like for estimating a work status when a prescribed worker performs prescribed work.

The manufacturing industry previously having been centered on "low-mix, high-volume production" is required to shift to "high-mix, low-volume production" in order to address the diversification of consumer needs. Features of high-mix, low-volume production are that the number of product types is extremely large and that new products (some products are similar in many aspects to existing products rather than being completely new) are made available in quick succession, making it difficult to formulate a production plan. One reason for the difficulty of formulating a production plan is that it is difficult to estimate a standard work time. Generally, for each work (process), a standard work time is generally determined based on an actual measurement of work time using a stopwatch or the like or on a calculation and an estimation by statistical analysis from past work history. However, in the case of worker-centered work, since a standard work time varies in accordance with differences in skill levels or the like among workers, the standard work time must be estimated on a per-worker basis.

Actually measuring work time requires taking measurements of all workers as well as taking new measurements every time a new worker is added or new work occur and can be a major hassle.

On the other hand, when calculating a standard work time based on past work history, there is a problem that estimation of the standard work time is difficult if a worker has no experience of certain work and therefore does not have a work history.

In addition, in the case of worker-centered work, although a production plan is preferably created by taking a variance in quality (failure occurrence rate) among workers into consideration, in a similar manner to estimating a standard work time, there is a problem that estimation of the failure occurrence rate is difficult if a worker has no experience of target work and therefore does not have a work history.

As an example of a related technique, Japanese Patent Application Publication No. 2007-133664 discloses a method including: selecting a product similar to a new product from performance data of each product previously produced by a target production process; calculating, based on the performance data, prediction data of a standard work time, standard work man-hours, a work difficulty and a material procurement period, a level of fatigue of a worker, and a proficiency of the worker with respect to the new product; performing, based on the prediction data, a preliminary simulation of a production process of the new product using a production process simulator; and creating a production plan based on a result of the preliminary simulation.

SUMMARY

However, with the technique disclosed in Japanese Patent Application Publication No. 2007-133664, there are limits to making estimates including differences in characteristics of workers. Considering that standard work times of workers normally vary depending on characteristics of the workers, determining a uniform standard work time without taking characteristics of workers into consideration may create a discrepancy from an actual work time and, as a result, may have an adverse effect on production scheduling.

The present invention has been made in consideration of the circumstances described above, and an object thereof is to provide a technique that enables a work status in prescribed work by a worker to be appropriately estimated. Another object of the present invention is to provide a technique that enables a worker to be allocated to work to be appropriately recommended.

In order to achieve the objects described above, a production management support apparatus according to a first aspect is a production management support apparatus that estimates a work status of a worker with respect to prescribed work, the production management support apparatus including a processor that executes processes, wherein the processor is configured to execute: a process of acquiring, from a capability information storage unit storing capability information related to capabilities of a plurality of workers, the capability information; a process of acquiring, from a work information storage unit storing work information related to work contents of a plurality of kinds of work, the work information; a process of acquiring, from a work performance information storage unit storing work performance information including a work status of a plurality of kinds of work actually executed by the plurality of workers, the work performance information; a process of accepting a designation of a target worker that is a worker for which a work status is estimated, and a designation of target work that is work for which the work status is estimated; a model generation process of acquiring the work performance information of the plurality of workers related to the plurality of kinds of work and generating a predictive model which adopts a work status in the work performance information of each work as a target variable, and which adopts any plurality of feature amounts among feature amounts included in the work information and the capability information as an explanatory variable; an estimation process of applying the predictive model to the capability information of the target worker and the work information of the target work, to estimate a work status when the target work is performed by the target worker; and a display output process of displaying and outputting the estimated work status.

According to the present invention, a work status in prescribed work by a prescribed worker can be appropriately estimated. In addition, according to the present invention, a worker to be allocated to work can be appropriately recommended.

BRIEF DESCRIPTION OF THE DRAWINGS

FIG. 2 is a configuration diagram of a process information management database according to an embodiment;

FIG. 3 is a configuration diagram of a worker information management database according to an embodiment;

FIG. 4 is a configuration diagram of a work performance information management database according to an embodiment;

FIG. 5 is a configuration diagram of a feature amount table according to an embodiment;

FIG. 6 is a configuration diagram of a standard work time/failure occurrence rate database according to an embodiment;

FIG. 7 is a diagram showing a standard work time/failure occurrence rate estimate display screen according to an embodiment;

FIG. 8 is a diagram showing a worker candidate recommendation screen when a constraint is configured according to an embodiment;

DETAILED DESCRIPTION OF THE EMBODIMENT

An embodiment will be described with reference to the drawings. It should be noted that the embodiment described below is not intended to limit the invention as set forth in the accompanying claims and that all of the elements and combinations thereof described in the embodiment are not necessarily essential to solutions proposed by the invention.

Although information will be described below using expressions such as an "AAA table", information may be expressed using any kind of data structure. In other words, an "AAA table" can also be referred to as "AAA information" in order to demonstrate that information is not dependent on data structure.

Figure 1:
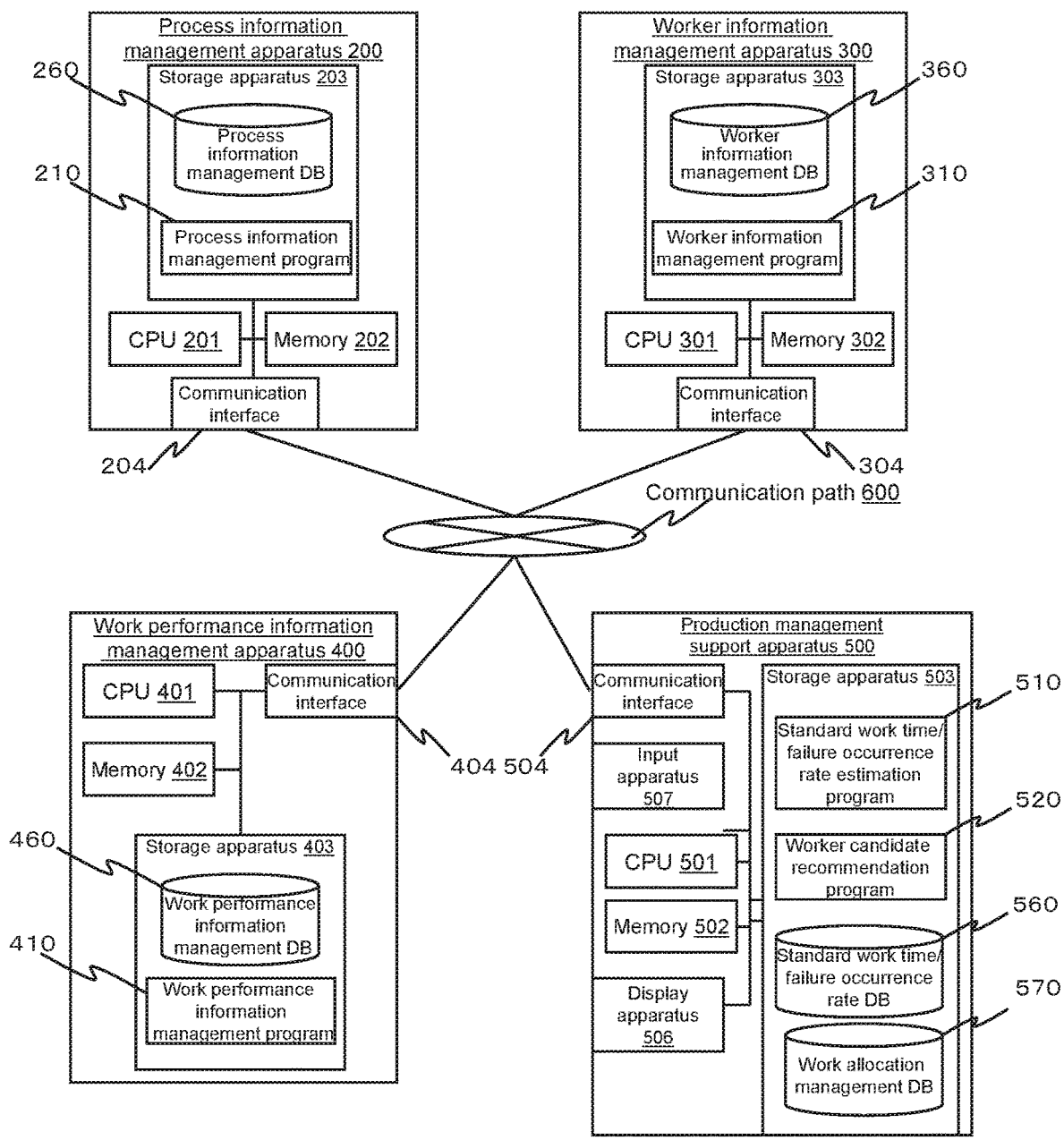
FIG. 1 is an overall configuration diagram of a production management support system according to an embodiment.

FIG. 1 is an overall configuration diagram of a production management support system according to an embodiment.

A production management support system 100 includes a process information management apparatus 200, a worker information management apparatus 300, a work performance information management apparatus 400, a production management support apparatus 500, and a communication path 600 that couples the apparatuses with each other.

The communication path 600 is, for example, a communication path such as a wired local area network (LAN) or a wireless LAN.

The process information management apparatus 200 is constituted by, for example, a personal computer (PC). The process information management apparatus 200 manages process information (work information) related to contents of work, and transmits the process information to the production management support apparatus 500 in response to a request from the production management support apparatus 500. The process information management apparatus 200 includes a central processing unit (CPU) 201, a memory 202, a storage apparatus 203, and a communication interface 204.

The communication interface 204 is, for example, an interface such as a wired LAN card or a wireless LAN card and communicates with other apparatuses (for example, the production management support apparatus 500) via the communication path 600.

The CPU 201 executes various processes in accordance with a program stored in the memory 202 and/or the storage apparatus 203.

The memory 202 is, for example, a random access memory (RAM) and stores a program executed by the CPU 201 as well as necessary information.

The storage apparatus 203 is, for example, a hard disk or a flash memory and stores a program executed by the CPU 201 and data used by the CPU 201. In the present embodiment, the storage apparatus 203 stores a process information management program 210 as the program and stores a process information management database (hereinafter, a database may also be referred to as a DB) 260 as the data. The process information management program 210 is a program for managing the process information management DB 260. The process information management DB 260 is an example of a work information storage unit and is a database for managing process information (work information). For example, process information may include information on a bill of materials (BOM) or may include, besides information on a BOM, an inventory status (for example, an inventory amount) of materials used for work, a status of a device used for work (an elapsed time from previous maintenance, an elapsed time from a date of introduction, or the like), and an abnormal state (information on whether or not an abnormality exists, an error code in case an abnormality exists, or the like). The process information management DB 260 is read and written by the CPU 201 executing the process information management program 210. Each record of process information stored in the process information management DB 260 is configured in advance by causing a display apparatus (not shown) to display an input screen for inputting information and accepting input using an input apparatus or the like (not shown) by a user of the process information management apparatus 200. A detailed configuration of the process information management DB 260 will be described later.

The worker information management apparatus 300 is constituted by, for example, a PC. The worker information management apparatus 300 manages worker information including capability information related to capabilities of a worker, and transmits the worker information to the production management support apparatus 500 in response to a request from the production management support apparatus 500. The worker information management apparatus 300 includes a CPU 301, a memory 302, a storage apparatus 303, and a communication interface 304.

The communication interface 304 is, for example, an interface such as a wired LAN card or a wireless LAN card and communicates with other apparatuses (for example, the production management support apparatus 500) via the communication path 600.

The CPU 301 executes various processes in accordance with a program stored in the memory 302 and/or the storage apparatus 303.

The memory 302 is, for example, a RAM and stores a program executed by the CPU 301 as well as necessary information.

The storage apparatus 303 is, for example, a hard disk or a flash memory and stores a program executed by the CPU 301 and data used by the CPU 301. In the present embodiment, the storage apparatus 303 stores a worker information management program 310 as the program and stores a worker information management DB 360 as the data. The worker information management program 310 is a program for managing the worker information management DB 360. The worker information management DB 360 is an example of a capability information storage unit and is a database for managing worker information. The worker information management DB 360 is read and written by the CPU 301 executing the worker information management program 310. A detailed configuration of the worker information management DB 360 will be described later. Moreover, each record of the worker information management DB 360 is configured in advance by causing a display apparatus (not shown) to display an input screen for inputting information and accepting input using an input apparatus or the like (not shown) by a user of the worker information management apparatus 300.

The work performance information management apparatus 400 is constituted by, for example, a PC, manages information (work performance information) such as a work status related to performance of work by a worker, and outputs the work performance information to the production management support apparatus 500 in response to a request from the production management support apparatus 500. The work performance information management apparatus 400 includes a CPU 401, a memory 402, a storage apparatus 403, and a communication interface 404.

The communication interface 404 is, for example, an interface such as a wired LAN card or a wireless LAN card and communicates with other apparatuses (for example, the production management support apparatus 500) via the communication path 600.

The CPU 401 executes various processes in accordance with a program stored in the memory 402 and/or the storage apparatus 403.

The memory 402 is, for example, a RAM and stores a program executed by the CPU 401 as well as necessary information.

The storage apparatus 403 is, for example, a hard disk or a flash memory and stores a program executed by the CPU 401 and data used by the CPU 401. The storage apparatus 403 stores a work performance information management program 410 as the program and stores a work performance information management DB 460 as the data. The work performance information management program 410 is a program for managing the work performance information management DB 460. The work performance information management DB 460 is an example of a work performance information storage unit and is, for example, a database that manages work performance data recorded in real time by a point of production (POP) system at a production site, in which case work performance data is received from, for example, a POP system (not shown). The work performance information management DB 460 is read and written by the CPU 401 executing the work performance information management program 410. A detailed configuration of the work performance information management DB 460 will be described later.

The production management support apparatus 500 is, for example, constituted by a PC and executes a process of estimating a work status (a standard work time, a failure occurrence rate, or the like) with respect to prescribed work by a prescribed worker and a process of recommending a worker suitable for the prescribed work. The production management support apparatus 500 includes a CPU 501 as an example of a processor, a memory 502, a storage apparatus 503, a communication interface 504, a display apparatus 506, and an input apparatus 507.

The communication interface 504 is, for example, an interface such as a wired LAN card or a wireless LAN card and communicates with other apparatuses (for example, the process information management apparatus 200, the worker information management apparatus 300, and the work performance information management apparatus 400) via the communication path 600.

The CPU 501 executes various processes in accordance with a program stored in the memory 502 and/or the storage apparatus 503.

The memory 502 is, for example, a RAM and stores a program executed by the CPU 501 as well as necessary information. In the present embodiment, for example, the memory 502 stores a feature amount table 670 (refer to FIG. 5) that is generated when the CPU 501 executes a standard work time/failure occurrence rate estimation program 510.

The storage apparatus 503 is, for example, a hard disk or a flash memory and stores a program executed by the CPU 501 and data used by the CPU 501. The storage apparatus 503 stores the standard work time/failure occurrence rate estimation program 510 and a worker candidate recommendation program 520 as programs and stores a standard work time/failure occurrence rate DB 560 and a work allocation management DB 570 as data. In the present embodiment, the standard work time/failure occurrence rate estimation program 510 and the worker candidate recommendation program 520 correspond to production management support programs.

The standard work time/failure occurrence rate estimation program 510 is a program for executing a standard work time/failure occurrence rate estimation process (refer to FIG. 11) to be described later. Details of the standard work time/failure occurrence rate estimation process will be described later.

The worker candidate recommendation program 520 is a program for executing a worker candidate recommendation process (refer to FIG. 12) to be described later. Details of the worker candidate recommendation process will be described later.

The standard work time/failure occurrence rate DB 560 is a database for managing a result of execution of the standard work time/failure occurrence rate estimation program 510 and is used by being accessed by the CPU 501 executing the worker candidate recommendation program 520. Details of the standard work time/failure occurrence rate DB 560 will be described later.

The work allocation management DB 570 is a database for managing information (allocation information) of work allocated to a worker. For example, the work allocation management DB 570 manages, in association with each other, a worker ID indicating a worker, a work ID corresponding to allocated work, an execution date of the work, and the like.

Next, a detailed configuration of the process information management DB 260 will be described.

FIG. 2 is a configuration diagram of the process information management DB 260 according to an embodiment.

The process information management DB 260 stores, for each work (process), a record (entry) including columns (fields) such as a work ID 260a, a work name 260b, a processing method 260c, a required accuracy 260d, a size 260e, a weight 260f, a processing area 260g, a level of complexity 260h, an "operation 1" 260i1, the "number of times of operation 1" 260i2, an "operation 2" 260i3, and the "number of times of operation 2" 260i4. Moreover, while FIG. 2 shows the four columns of the "operation 1", the "number of times of operation 1", the "operation 2", and the "number of times of operation 2" as columns related to operations and the number of times of the operations, in the present embodiment, a sufficient number of columns for storing an operation name and the number of times of an operation for each of a plurality of operations executed in a process are prepared in a record. For example, when a maximum number of operations assumed in a process is 10, 20 columns capable of storing an operation name and the number of times of an operation corresponding to each operation are prepared.

In the work ID 260a, information (a work ID) which uniquely identifies work corresponding to the record is configured. In the work name 260b, a work name of the work corresponding to the record is configured. In the processing method 260c, a processing method of the work corresponding to the record is configured. In the required accuracy 260d, a grade related to accuracy required by the work corresponding to the record is configured. In the size 260e, a size configured in a design drawing with respect to a processed article of the work corresponding to the record is configured. In the weight 260f, a weight configured in a design drawing with respect to the processed article of the work corresponding to the record is configured. In the processing area 260g, an area requiring processing as configured in a design drawing with respect to the processed article of the work corresponding to the record is configured. In the level of complexity 260h, a degree of complexity (level of complexity) of processing as configured in a design drawing with respect to the processed article of the work corresponding to the record is configured.

In the "operation 1" 260i1, the "operation 2" 260i3, . . . , a name of each operation in the work corresponding to the record is configured. In the "number of times of operation 1" 260i2, the "number of times of operation 2" 260i4, . . . , the number of times each operation in the work corresponding to the record is executed is configured. Moreover, in an "operation A (where A is a numeral)" column corresponding to an operation not included in the work, "-" indicating that the operation does not exist is configured, and "0" is configured in a corresponding "number of times of operation A" column. For example, when the work corresponding to the record can be broken down into three operations of an "operation 1", an "operation 2", and an "operation 3", "-" is configured in the "operation A" columns of an "operation 4" and thereafter and "0" is configured in the "number of times of operation A" columns of the "number of times of operation 4" and thereafter.

Next, a detailed configuration of the worker information management DB 360 will be described.

FIG. 3 is a configuration diagram of the worker information management DB 360 according to an embodiment.

The worker information management DB 360 manages records related to capabilities of workers. A record in the worker information management DB 360 includes columns of a modification date 360a, a worker ID 360b, a worker name 360c, an age 360d, a gender 360e, skill levels (a "skill 1 level" 360f1, a "skill 2 level" 360f3, . . . ), years of skill experience ("years of skill 1 experience" 360f2, "years of skill 2 experience" 360f4, . . . ), and qualifications (a "qualification 1" 360g1, a "qualification 2" 360g2, . . . ). Moreover, while FIG. 3 shows the six columns of the "skill 1 level" 360f1, the "years of skill 1 experience" 360f2, the "skill 2 level" 360f3, the "years of skill 2 experience" 360f4, the "qualification 1" 360g1, and the "qualification 2" 360g2 as columns related to skills and qualifications, columns are prepared in a record in the number corresponding to an assumed number of skills and an assumed number of qualifications. For example, when a worker has four skills and two qualifications, information corresponding to 10 columns related to skills and qualifications is configured.

In the modification date 360a, a date is configured on which a modification had occurred in any of the columns of the age 360d, the skill levels (the skill 1 level 360f1, the skill 2 level 360f3, . . . ), the years of skill experience (the years of skill 1 experience 360f2, the years of skill 2 experience 360f4, . . . ), and the qualifications (the "qualification 1" 360g1, the "qualification 2" 360g2, . . . ) of a worker corresponding to the record.

In the worker ID 360b, a worker ID which uniquely identifies the worker corresponding to the record is configured. In the worker name 360c, a name of the worker corresponding to the record is configured. In the age 360d, an age of the worker corresponding to the record is configured. In the gender 360e, a gender of the worker corresponding to the record is configured.

In the skill 1 level 360f1, an appraised level with respect to a skill 1 of the worker corresponding to the record is configured. When the worker corresponding to the record does not have the skill 1, "0" is configured in the skill 1 level 360f1.

In the years of skill 1 experience 360f2, the years of experience in the skill 1 of the worker corresponding to the record is configured. When the worker corresponding to the record does not have the skill 1, "0" is configured in the years of skill 1 experience 360f2.

In the skill 2 level 360f3, an appraised level with respect to a skill 2 of the worker corresponding to the record is configured. When the worker corresponding to the record does not have the skill 2, "0" is configured in the skill 2 level 360f3.

In the years of skill 2 experience 360f4, the years of experience in the skill 2 of the worker corresponding to the record is configured. When the worker corresponding to the record does not have the skill 2, "0" is configured in the years of skill 2 experience 360f4.

In the "qualification 1" 360g1, information on whether or not the worker corresponding to the record has a qualification 1 is configured and, for example, "○" is configured when the worker has the qualification 1 but "x" is configured when the worker does not have the qualification 1.

In the "qualification 2" 360g2, information on whether or not the worker corresponding to the record has a qualification 2 is configured and, for example, "○" is configured when the worker has the qualification 2 but "x" is configured when the worker does not have the qualification 2.

In the present embodiment, a modification history of capabilities of a worker is to be managed in the worker information management DB 360, and when a modification occurs in any of the columns (columns related to capabilities) of the age 360d, the skill levels (the skill 1 level 360f1, the skill 2 level 360f3, . . . ), the years of skill experience (the years of skill 1 experience 360f2, the years of skill 2 experience 360f4, . . . ), and the qualifications (the "qualification 1" 360g1, the "qualification 2", . . . ) of the worker, a new record in which a date of occurrence of the modification is configured as the modification date 360a is added instead of updating an existing record and, in the new record, columns corresponding to modified contents are configured to the contents after the modification while other columns that have not been modified are configured so as to retain their original contents. Therefore, a large number of records of a same worker may be stored in the worker information management DB 360. Moreover, each record is uniquely identified in the worker information management DB 360 by the worker ID indicated by the worker ID 360b and the date indicated by the modification date 360a. Due to such management of records, a history related to capabilities of a same worker can be appropriately managed.

Next, a detailed configuration of the work performance information management DB 460 will be described.

FIG. 4 is a configuration diagram of the work performance information management DB 460 according to an embodiment.

The work performance information management DB 460 manages a record of an actual work status (work performance) with respect to work executed by each worker. A record in the work performance information management DB 460 includes columns of a work ID 460a, a worker ID 460b, a work start time 460c, a work end time 460d, and an acceptance determination 460e.

In the work ID 460a, a work ID which uniquely identifies work corresponding to the record is configured. In the worker ID 460b, a worker ID which uniquely identifies a worker corresponding to the record is configured. In the work start time 460c, a start time of the work corresponding to the record is configured. The start time is recorded by, for example, a POP system. In the work end time 460d, an end time of the work corresponding to the record is configured. The end time is recorded by, for example, a POP system. In the acceptance determination 460e, a result of an acceptance determination (a determination of whether or not a failure has occurred) is configured with respect to an actual state of a processed article having been processed by the worker corresponding to the record through the work corresponding to the record.

Next, a detailed configuration of the feature amount table 670 will be described.

FIG. 5 is a configuration diagram of a feature amount table according to an embodiment.

The feature amount table 670 is data which is temporarily stored on the memory 502 when the CPU 501 executes the standard work time/failure occurrence rate estimation program 510 and which is generated based on the process information management DB 260, the worker information management DB 360, and the work performance information management DB 460.

The feature amount table 670 stores records including columns of a work ID 670a, a work name 670b, a worker ID 670c, a worker name 670d, a work time 670e, a failure occurrence rate 670f, a start date 670g, a processing method 670h, a required accuracy 670i, a size 670j, a weight 670k, a processing area 670l, a level of complexity 670m, an "operation 1" 670n1, the number of times of operation 1 670n2, an "operation 2" 670n3, the number of times of operation 2 670n4, an age 670o, a gender 670p, a skill 1 level 670q1, years of skill 1 experience 670q2, a skill 2 level 670q3, years of skill 2 experience 670q4, a "qualification 1" 670r1, and a "qualification 2" 670r2.

In the work ID 670a, a work ID of work identified as being highly similar to work (estimation target work) which is target for estimating a work status is configured. In the work name 670b, a name of the work corresponding to the work ID in the work ID 670a is configured. In the worker ID 670c, a worker ID in the worker ID 460b in a record corresponding to the work ID in the work ID 670a in the work performance information management DB 460 is configured. In the worker name 670d, a name of the worker corresponding to the worker ID in the worker ID 670c is configured. In the work time 670e, a work time is configured based on a time difference between a work end time in the work end time 460d and a work start time in the work start time 460c in a record of the work performance information management DB 460 which matches the work ID in the work ID 670a and the worker ID in the worker ID 670c of this record. Moreover, when there are a plurality of records of the work performance information management DB 460 which match the work ID in the work ID 670a and the worker ID in the worker ID 670c of this record, an average value of time differences between a work end time in the work end time 460d and a work start time in the work start time 460c in the plurality of records is configured.

In the failure occurrence rate 670f, a value obtained by calculating a ratio of records including "x" in the acceptance determination 460e in records of the work performance information management DB 460 which matches the work ID in the work ID 670a and the worker ID in the worker ID 670c of this record is configured. In the start date 670g, a date portion of a work start time in the work start time 460c in a record of the work performance information management DB 460 which matches the work ID in the work ID 670a and the worker ID in the worker ID 670c of this record (when there are a plurality of matching records, a date portion of a work start time having a minimum value) is configured.

In the processing method 670h, a processing method in the processing method 260c of a record in the process information management DB 260 matching the work ID in the work ID 670a of this record is configured. In the required accuracy 670i, a required accuracy in the required accuracy 260d of a record in the process information management DB 260 matching the work ID in the work ID 670a of this record is configured. In the size 670j, a size in the size 260e of a record in the process information management DB 260 matching the work ID in the work ID 670a of this record is configured. In the weight 670k, a weight in the weight 260f of a record in the process information management DB 260 matching the work ID in the work ID 670a of this record is configured. In the processing area 670l, a processing area in the processing area 260g of a record in the process information management DB 260 matching the work ID in the work ID 670a of this record is configured.

In the level of complexity 670m, a level of complexity in the level of complexity 260h of a record in the process information management DB 260 matching the work ID in the work ID 670a of this record is configured. In the "operation 1" 670n1, operation contents of the "operation 1" 260i1 of a record in the process information management DB 260 matching the work ID in the work ID 670a of this record is configured. In the number of times of operation 1 670n2, the number of times of operation in the number of times of operation 1 260i2 of a record in the process information management DB 260 matching the work ID in the work ID 670a of this record is configured. In the "operation 2" 670n3, operation contents of the "operation 2" 260i3 of a record in the process information management DB 260 matching the work ID in the work ID 670a of this record is configured. In the number of times of operation 2 670n4, the number of times of operation in the number of times of operation 2 260i4 of a record in the process information management DB 260 matching the work ID in the work ID 670a of this record is configured.

In the age 670o, an age of the worker at the time point of the start date 670g which is identified from a record read from the work performance information management DB 460 and matching the work ID in the work ID 670a and the worker ID in the worker ID 670c of this record is configured. In the gender 670p, a gender indicated by the gender 360e of a record in the worker information management DB 360 matching the worker ID in the worker ID 670c of this record is configured. In the skill 1 level 670q1, a level of the skill 1 corresponding to the time point of the start date 670g in a record in the worker information management DB 360 matching the worker ID in the worker ID 670c of this record is configured. In the years of skill 1 experience 670q2, the years of experience in the skill 1 corresponding to the time point of the start date 670g in a record in the worker information management DB 360 matching the worker ID in the worker ID 670c of this record is configured. In the skill 2 level 670*q*3, a level of the skill 2 corresponding to the time point of the start date 670*g* in a record in the worker information management DB 360 matching the worker ID in the worker ID 670*c* of this record is configured. In the years of skill 2 experience 670*q*4, the years of experience in the skill 2 corresponding to the time point of the start date 670*g* in a record in the worker information management DB 360 matching the worker ID in the worker ID 670*c* of this record is configured. In the "qualification 1" 670*r*1, a presence or absence of the qualification 1 corresponding to the time point of the start date 670*g* in a record in the worker information management DB 360 matching the worker ID in the worker ID 670*c* of this record is configured. In the "qualification 2" 670*r*2, a presence or absence of the qualification 2 corresponding to the time point of the start date 670*g* in a record in the worker information management DB 360 matching the worker ID in the worker ID 670*c* of this record is configured.

Next, a detailed configuration of the standard work time/failure occurrence rate DB 560 will be described.

FIG. 6 is a configuration diagram of the standard work time/failure occurrence rate DB 560 according to an embodiment.

The standard work time/failure occurrence rate DB 560 manages, for each combination of a work ID and a worker ID calculated by the CPU 501 by executing the standard work time/failure occurrence rate estimation program 510, estimated values of a work status (a standard work time and a failure occurrence rate) as well as a work ID, a worker ID, and the like most similar thereto.

The standard work time/failure occurrence rate DB 560 manages records including columns of a work ID 560*a*, a work name 560*b*, a worker ID 560*c*, a worker name 560*d*, an estimated work time 560*e*, an estimated failure occurrence rate 560*f*, a similar work ID 560*g*, a work similarity 560*h*, a similar worker ID 560*i*, a worker similarity 560*j*, and a similar worker history update date 560*k*.

In the work ID 560*a*, a work ID of work (target work) which is target for estimating a standard work time and a failure occurrence rate in the standard work time/failure occurrence rate estimation process is configured. In the work name 560*b*, a name of the work corresponding to the work ID in the work ID 560*a* is configured. In the worker ID 560*c*, a worker ID of a worker (target worker) which is a target for estimating a standard work time and a failure occurrence rate in the standard work time/failure occurrence rate estimation process is configured. In the worker name 560*d*, a name of the worker corresponding to the worker ID in the worker ID 560*c* is configured. In the estimated work time 560*e*, a standard work time estimated by the standard work time/failure occurrence rate estimation process with respect to a combination of a work ID in the work ID 560*a* and a worker ID in the worker ID 560*c* of this record is configured. In the estimated failure occurrence rate 560*f*, a failure occurrence rate estimated by the standard work time/failure occurrence rate estimation process with respect to the combination of a work ID in the work ID 560*a* and a worker ID in the worker ID 560*c* of this record is configured.

In the similar work ID 560*g*, a work ID of similar work is configured so as to provide a combination with a largest product of a similarity between work (target work) with the work ID in the work ID 560*a* and similar work (in the present embodiment, same work may suffice) and a similarity between a worker (target worker) with the worker ID in the worker ID 560*c* and a similar worker. In the work similarity 560*h*, a similarity between work (target work) with the work ID in the work ID 560*a* and work (similar work) with the work ID in the similar work ID 560*g* is configured. In the similar worker ID 560*i*, a worker ID of a similar worker is configured so as to provide a combination with a largest product of a similarity between work (target work) with the work ID in the work ID 560*a* and similar work and a similarity between a worker (target worker) with the worker ID in the worker ID 560*c* and a similar worker. In the worker similarity 560*j*, a similarity between a worker (target worker) with the worker ID in the worker ID 560*c* and a similar worker is configured. In the similar worker history update date 560*k*, a modification date in the modification date 360*a* of a record in the worker information management DB 360 corresponding to a worker ID of a similar worker is configured in a case where a combination with a largest product of a similarity between work (target work) with the work ID in the work ID 560*a* and similar work and a similarity between a worker (target worker) with the worker ID in the worker ID 560*c* and a similar worker is provided.

Next, a standard work time/failure occurrence rate estimate display screen will be described.

FIG. 7 is a diagram showing a standard work time/failure occurrence rate estimate display screen.

A standard work time/failure occurrence rate estimate display screen 700 is a screen which is displayed on the display apparatus 506 of the production management support apparatus 500 when the standard work time/failure occurrence rate estimation process is being executed for accepting input by an apparatus user from the input apparatus 507 and displaying a result of the process. The standard work time/failure occurrence rate estimate display screen 700 is displayed by the CPU 501 that executes the standard work time/failure occurrence rate estimation program 510.

The standard work time/failure occurrence rate estimate display screen 700 includes a target work selection area 710, a target worker selection area 720, an estimation execution button 730, and an estimation result display area 740.

The target work selection area 710 is an area for selecting and indicating work (target work) to be an estimation target, and a target work selection table that enables target work and a target work ID to be selected is displayed in the area. The target work selection table is displayed based on a list of target work created using information acquired from the process information management DB 260 in step S51001 in FIG. 11 to be described later. A part of or all of target work can be selected by the apparatus user from the target work selection table.

The target worker selection area 720 is an area for selecting and indicating a worker (target worker) to be an estimation target, and a target worker selection table that associates a target worker and a target worker ID with each other is displayed in the area. The target worker selection table is displayed based on a list of target workers created using information acquired from the worker information management DB 360 in step S51002 in FIG. 11 to be described later. A part of or all of target workers can be selected by the apparatus user from the target worker selection table.

The estimation execution button 730 is a button for making a processing request to the CPU 501 that executes the standard work time/failure occurrence rate estimation program 510 to estimate a standard work time and a failure occurrence rate for each combination of target work selected using the target work selection table and a target worker selected using the target worker selection table.

An estimation result table indicating a processing result from the CPU 501 that executes the standard work time/ failure occurrence rate estimation program 510 is displayed in the estimation result display area 740. A work ID, a work name, a worker ID, a worker name, an estimated work time, and an estimated failure occurrence rate is displayed in the estimation result table. The estimation result table is output in step S51013 in FIG. 11 to be described later. The work ID and the work name correspond to an estimation target work and the worker ID and the worker name correspond to an estimation target worker. The estimated work time and the estimated failure occurrence rate represent results (a standard work time and a failure occurrence rate) estimated by the standard work time/failure occurrence rate estimation process. From the estimation result table, the apparatus user can readily and appropriately confirm estimation results of the standard work time and the failure occurrence rate when each worker performs each work.

Next, a worker candidate recommendation screen when a constraint is configured will be described.

FIG. 8 is a diagram showing a worker candidate recommendation screen when a constraint is configured according to an embodiment. FIG. 8 represents a worker candidate recommendation screen when constraints on a standard work time and a failure occurrence rate are configured with respect to a worker to be a recommendation candidate.

A worker candidate recommendation screen 800 is a screen which is displayed on the display apparatus 506 of the production management support apparatus 500 when the worker candidate recommendation process is being executed for accepting input by the apparatus user from the input apparatus 507 and displaying a result of the process. The worker candidate recommendation screen 800 is displayed by the CPU 501 that executes the worker candidate recommendation program 520.

The worker candidate recommendation screen 800 includes a target work designation area 810, a constraint input area 820, a scatter diagram display area 830, a constraint addition button 840, a constraint reflection button 850, a worker candidate recommendation execution button 860, a worker candidate list display area 870, an allocation button 880, and a detail confirmation button 890.

The target work designation area 810 is an area for designating work (recommendation target work) which is a target for recommending a worker candidate, and enables the apparatus user to select and indicate any one of target work selected in the target work selection table shown in FIG. 7 by operating the input apparatus 507.

The constraint input area 820 is an area for inputting constraints related to a work time (standard work time) and a failure occurrence rate with respect to a worker to be selected as a work candidate, and enables the apparatus user to input a constraint by operating the input apparatus 507. The worker candidate recommendation screen 800 shown in FIG. 8 is in a state where three constraints have already been input.

The constraint addition button 840 is a button for issuing an instruction to add a constraint and, when the constraint addition button 840 is pressed, a single field for inputting a constraint is added to the constraint input area 820. The constraint reflection button 850 is a button for issuing an instruction to draw all constraints input to the constraint field on a scatter diagram and, when pressed, constraints are drawn onto the scatter diagram.

A scatter diagram that plots, in accordance with a standard work time and a failure occurrence rate (including an estimated standard work time and an estimated failure occurrence rate), a state of each worker with respect to recommendation target work designated in the target work designation area 810 is displayed in the scatter diagram display area 830. Displayed workers are, for example, workers corresponding to the recommendation target work among workers output in step S51013 in FIG. 11 to be described later.

The worker candidate recommendation execution button 860 is a button for making, after selecting recommendation target work and inputting and reflecting a constraint, a recommendation request of a worker candidate to the CPU 501 that executes the worker candidate recommendation program 520.

A worker candidate list representing a processing result from the CPU 501 that executes the worker candidate recommendation program 520 is displayed the worker candidate list display area 870. A worker ID, a worker name, an estimated work time, an estimated failure occurrence rate, a recommendation level, and allocated work are displayed in the worker candidate list. In the present embodiment, the worker candidate list is configured to display workers satisfying all designated constraints as well as workers not satisfying the constraints. In the present embodiment, a record of a worker not satisfying the constraints is displayed in a mode (for example, displayed in gray) which enables the worker to be distinguished from a worker who satisfies the constraints. In this case, the reason why workers not satisfying the constraints are also displayed is that workers satisfying the constraints are possibly already allocated to other work and there is a risk that allocations to the recommendation target work cannot be covered by workers satisfying the constraints alone.

The worker ID and the worker name indicate a worker ID and a worker name of workers satisfying the constraints as well as workers not satisfying the constraints. The estimated work time (standard work time) and the estimated failure occurrence rate (failure occurrence rate) represent results of estimations in step S51013 in FIG. 11 to be described later.

In the recommendation level, a value calculated using an individually designated calculation formula or a value calculated based on one of the constraints is displayed. The worker candidate list may display rankings based on recommendation levels.

In the allocated work, work already allocated to a worker corresponding to the record is displayed and, when no work is allocated to the worker, "none" is displayed. Moreover, the work to which the worker is allocated, or whether or not work is allocated to the worker can be identified by referring to the work allocation management DB 570.

The allocation button 880 is a button for making a request to allocate the worker corresponding to this button to recommendation target work to the CPU 501 that executes the worker candidate recommendation program 520.

The detail confirmation button 890 is a button for causing detailed information on the worker corresponding to the button to be displayed and, when pressed by the apparatus user, the worker history confirmation screen (refer to FIG. 10) is to be displayed by the CPU 501. Details of the worker history confirmation screen will be described later.

Next, a worker candidate recommendation screen when a constraint is not configured will be described.

Figure 9:
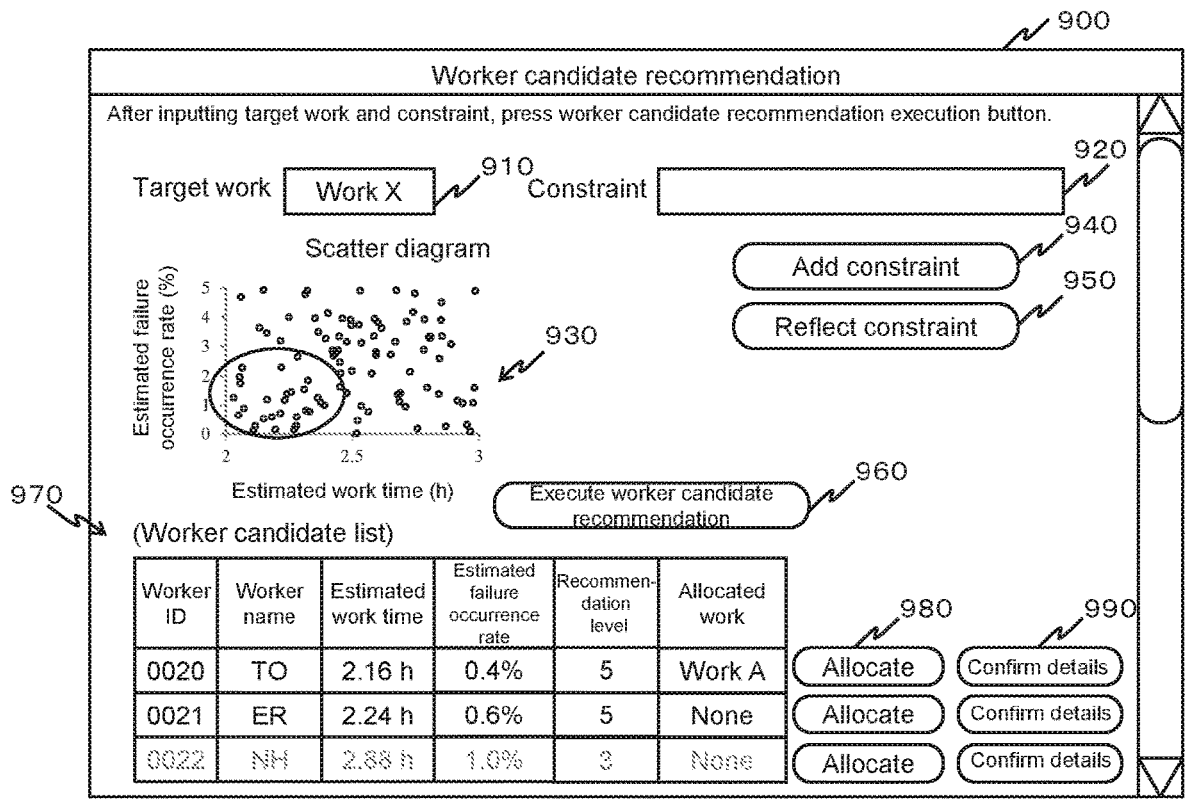
FIG. 9 is a diagram showing a worker candidate recommendation screen when a constraint is not configured according to an embodiment.

FIG. 9 is a screen diagram showing a worker candidate recommendation screen when a constraint is not configured. FIG. 9 represents a worker candidate recommendation screen when constraints on a standard work time and a failure occurrence rate are not configured with respect to a worker to be a candidate.

A worker candidate recommendation screen 900 is a screen which is displayed on the display apparatus 506 of the production management support apparatus 500 when the worker candidate recommendation process is being executed for accepting input by the apparatus user from the input apparatus 507 and displaying a result of the process. The worker candidate recommendation screen 900 is displayed by the CPU 501 that executes the worker candidate recommendation program 520.

The worker candidate recommendation screen 900 includes a target work designation area 910, a constraint input area 920, a scatter diagram display area 930, a constraint addition button 940, a constraint reflection button 950, a worker candidate recommendation execution button 960, a worker candidate list display area 970, an allocation button 980, and a detail confirmation button 990.

The target work designation area 910, the constraint input area 920, the constraint addition button 940, the constraint reflection button 950, the worker candidate recommendation execution button 960, the allocation button 980, and the detail confirmation button 990 are similar to the target work designation area 810, the constraint input area 820, the constraint addition button 840, the constraint reflection button 850, the worker candidate recommendation execution button 860, the allocation button 880, and the detail confirmation button 890 shown in FIG. 8.

In the scatter diagram display area 930, a scatter diagram that plots, in accordance with a standard work time and a failure occurrence rate (including an estimated standard work time and an estimated failure occurrence rate), a state of each worker with respect to recommendation target work designated in the target work designation area 910 is displayed. Displayed workers are, for example, worker corresponding to the recommendation target work among workers output in step S51013 in FIG. 11 to be described later. As a method of recommending a worker candidate when a constraint is not configured, in the present embodiment, workers are clustered and a worker candidate is recommended using a cluster to which a worker belongs (a clustering method will be described later (steps S52007 to S52011 in FIG. 12)). In a scatter diagram in the scatter diagram display area 930, a cluster with a centroid that is nearest to an origin is displayed.

In the worker candidate list display area 970, a worker candidate list representing a processing result from the CPU 501 that executes the worker candidate recommendation program 520 is displayed. In the worker candidate list, a worker ID, a worker name, an estimated work time, an estimated failure occurrence rate, a recommendation level, and allocated work are displayed. In the present embodiment, the worker candidate list is configured to display workers of a cluster (optimum cluster) nearest to the origin (nearest to bottom left) which is a most preferable cluster as well as workers of other clusters. In the present embodiment, a record of a worker of a cluster other than the optimum cluster is displayed in a mode (for example, displayed in gray) which enables the worker to be distinguished from a worker of the optimum cluster. In this case, the reason why workers of clusters other than the optimum cluster are also displayed is that workers of the optimum cluster are possibly already allocated to other work and there is a risk that allocations to the recommendation target work cannot be covered by workers of the optimum cluster alone.

The worker ID and the worker name indicate a worker ID and a worker name of workers of the optimum cluster and workers of clusters other than the optimum cluster. The estimated work time (standard work time) and the estimated failure occurrence rate (failure occurrence rate) represent results of estimations in step S51013 in FIG. 11 to be described later.

In the recommendation level, a value calculated using an individually designated calculation formula is displayed. The worker candidate list may display rankings based on recommendation levels.

IN the allocated work, work already allocated to a worker corresponding to the record is displayed and, when no work is allocated to the worker, "none" is displayed. Moreover, the work to which the worker is allocated or whether or not work is allocated to the worker can be identified by referring to the work allocation management DB 570.

Next, details of the worker history confirmation screen will be described.

Figure 10:
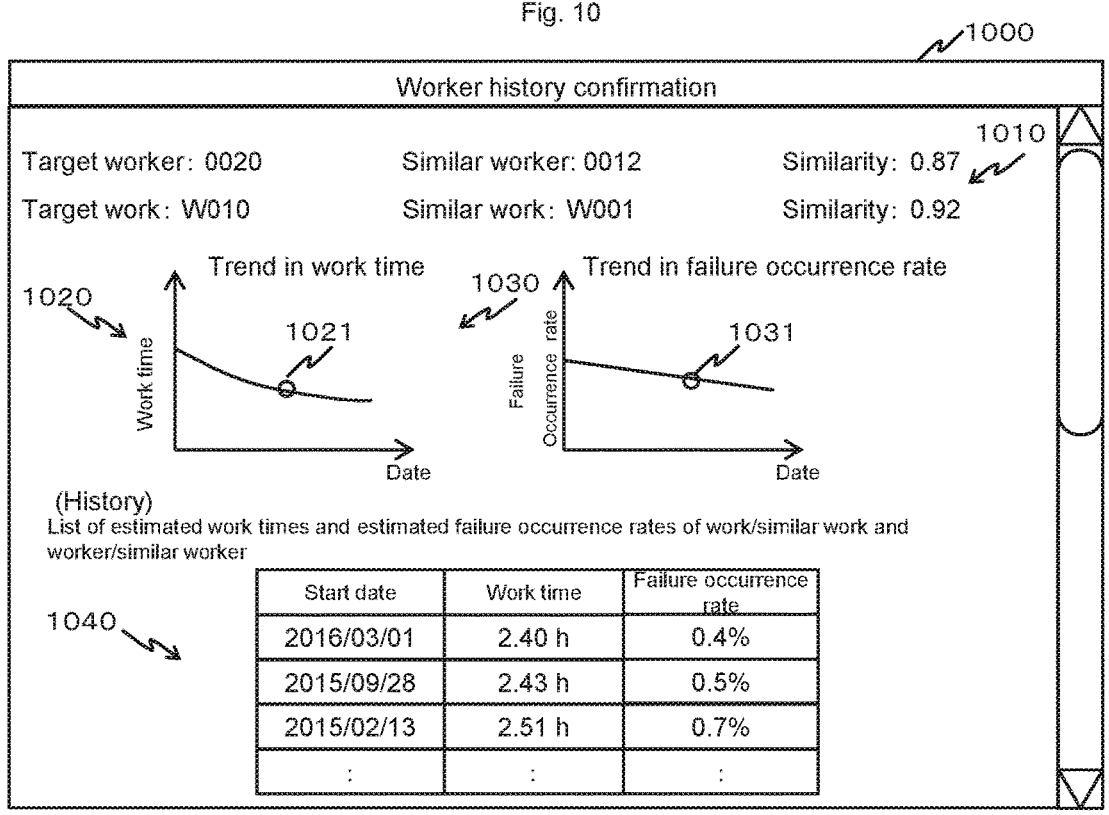
FIG. 10 is a diagram showing a worker history confirmation screen according to an embodiment.

FIG. 10 is a diagram showing a worker history confirmation screen according to an embodiment.

A worker history confirmation screen 1000 is displayed by the CPU 501 that executes the worker candidate recommendation program 520 when the detail confirmation button 890 shown in FIG. 8 or the detail confirmation button 990 shown in FIG. 9 is pressed.

The worker history confirmation screen 1000 includes a worker information display area 1010, a work time trend display area 1020, a failure occurrence rate trend display area 1030, and a work history display area 1040.

In the worker information display area 1010, a target worker, a similar worker, a similarity between the target worker and the similar worker, target work, similar work, and a similarity between the target work and the similar work are displayed. These pieces of information are acquired from a corresponding record in the standard work time/failure occurrence rate DB 560.

In the work time trend display area 1020, a graph representing a trend in standard work time with respect to a combination of target work and a target worker, a combination of target work and a similar worker, a combination of similar work and a target worker, or a combination of similar work and a similar worker is displayed. The graph representing a trend in the standard work time can be created based on a date in the similar worker history update date 560k and a standard work time in the estimated work time 560e in a record corresponding to any of a combination of target work and a target worker, a combination of target work and a similar worker, a combination of similar work and a target worker, or a combination of similar work and a similar worker which can be acquired from similar work performance information after merging in step S51009 in FIG. 11 to be described later. A point denoted by "○" in the graph represents a current time point of a target worker when the graph is displayed based on a work history of the target worker and represents a time point at which a state of capabilities of a similar worker had been the same as or similar to a state of capabilities of the target worker when the graph is displayed using a work history of the similar worker. According to this graph, a future trend of a standard work time by the target worker can be assessed based on a trend of a similar worker.

In the failure occurrence rate trend display area 1030, a graph representing a trend in the failure occurrence rate with respect to a combination of target work and a target worker, a combination of target work and a similar worker, a combination of similar work and a target worker, or a combination of similar work and a similar worker is displayed. The graph representing a trend in the failure occurrence rate can be created based on a date in the similar worker history update date 560k and a failure occurrence rate in the estimated failure occurrence rate 560f in a record corresponding to any of a combination of target work and a target worker, a combination of target work and a similar worker, a combination of similar work and a target worker, or a combination of similar work and a similar worker which can be acquired from similar work performance information after merging in step S51009 in FIG. 11 to be described later. A point denoted by "○" in the graph represents a current time point of a target worker when the graph is displayed based on a work history of the target worker and represents a time point at which a state of capabilities of a similar worker had been the same as or similar to a state of capabilities of the target worker when the graph is displayed using a work history of the similar worker. According to this graph, a future trend of a failure occurrence rate by the target worker can be assessed based on a trend of a similar worker.

According to the worker history confirmation screen 1000, the apparatus user can appropriately determine whether or not the worker can be allocated to work.

Next, a standard work time/failure occurrence rate estimation process will be described.

Figure 11:
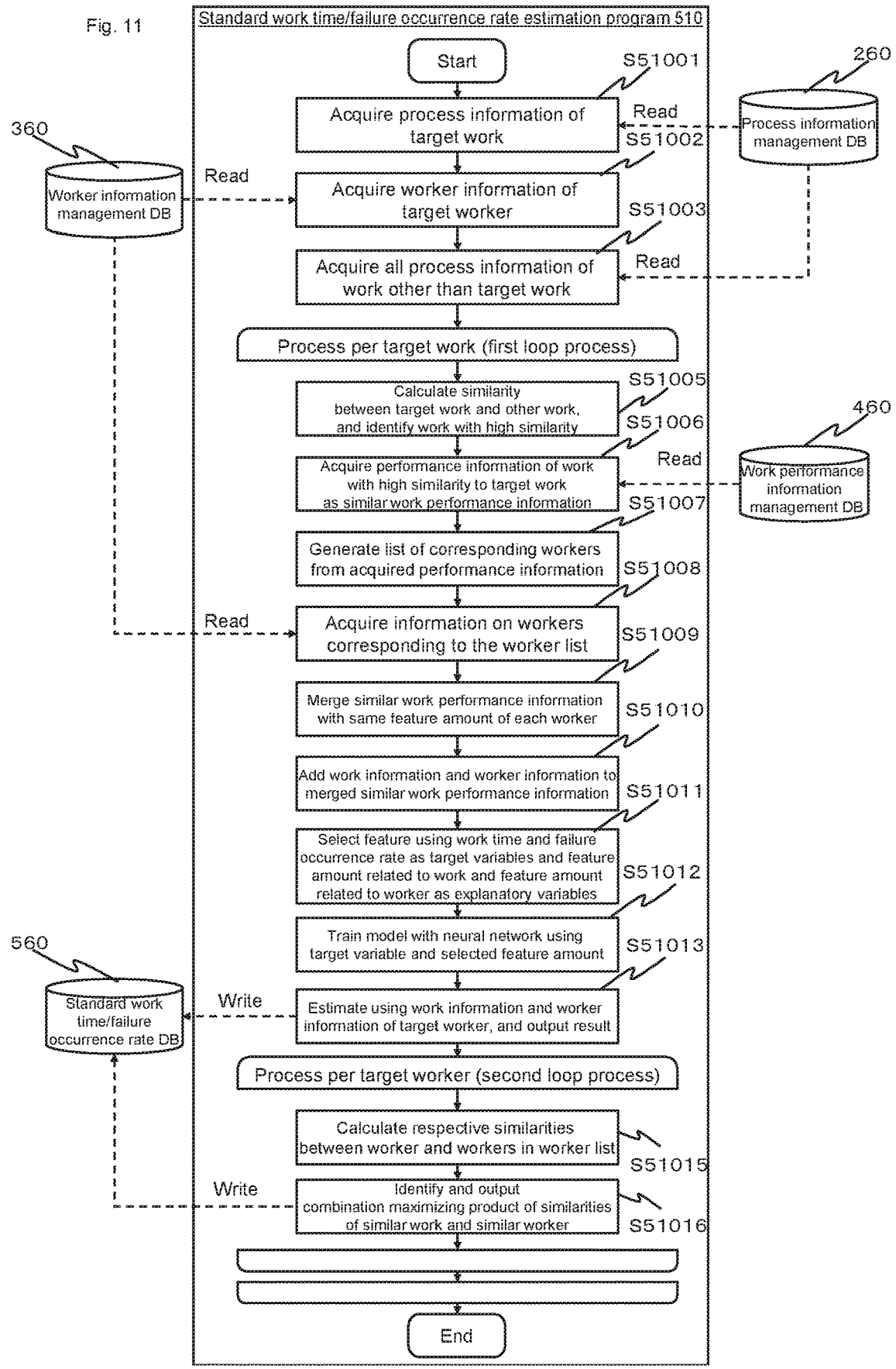
FIG. 11 is a flow chart of a standard work time/failure occurrence rate estimation process according to an embodiment.

FIG. 11 is a flow chart of the standard work time/failure occurrence rate estimation process.

As shown in FIG. 11, in the standard work time/failure occurrence rate estimation process, the CPU 501 that executes the standard work time/failure occurrence rate estimation program 510 acquires data from the process information management DB 260, the worker information management DB 360, and the work performance information management DB 460, performs an estimation process of a standard work time and a failure occurrence rate, and writes a result thereof in the standard work time/failure occurrence rate DB 560.

The standard work time/failure occurrence rate estimation process will now be described in detail.

When all apparatuses of the production management support system 100 have been started up and an instruction to execute the standard work time/failure occurrence rate estimation program 510 of the production management support apparatus 500 is issued by the apparatus user, the CPU 501 starts execution of the standard work time/failure occurrence rate estimation program 510 and causes the display apparatus 506 to display the standard work time/failure occurrence rate estimate display screen 700 shown in FIG. 7. When estimating a standard work time and a failure occurrence rate, the apparatus user is to select and indicate, on this screen, target work and a target worker for which the standard work time and the failure occurrence rate are to be estimated.

In step S51001, the CPU 501 accepts target work, a target work ID, a target worker, and a target worker ID selected by the apparatus user on the standard work time/failure occurrence rate estimate display screen 700 shown in FIG. 7, and acquires process information corresponding to the target work from the process information management DB 260.

Next, in step S51002, the CPU 501 acquires worker information of a target worker corresponding to the accepted target worker and target worker ID from the worker information management DB 360.

Next, in step S51003, the CPU 501 acquires process information of work other than the target work from the process information management DB 260.

Next, the CPU 501 executes, for each target work, a first loop process (steps S51005 to S51016).

In step S51005 of the first loop process, the CPU 501 calculates a similarity between the target work and another work based on the process information of the target work and the process information of the other work acquired in step S51003. As a method of calculating the similarity between the target work and other work, for example, the k-nearest neighbor method or singular value decomposition can be used. Subsequently, based on the calculated similarity between the target work and other work, the CPU 501 identifies work (hereinafter, referred to as similar work) with a high similarity to the target work. For example, work with a high similarity may be defined as work with a similarity that is equal to or higher than a prescribed threshold (for example, 0.9) or work with a similarity ranked in the top ten.

Next, in step S51006, the CPU 501 acquires, as similar work performance information, a record of work performance information corresponding to work with a high similarity to the target work identified in step S51005 from the work performance information management DB 460.

Next, in step S51007, the CPU 501 generates a list of corresponding workers (worker list) based on a worker ID in the worker ID 460b included in the similar work performance information acquired in step S51006.

Next, in step S51008, the CPU 501 acquires records of worker information (worker information records) of all workers included in the worker list generated in step S51007 from the worker information management DB 360. In this step, when acquiring worker information records of workers included in the worker list, if there are previous worker information records of the workers, the CPU 501 acquires such previous worker information records as well. Next, the CPU 501 adds a new record to the feature amount table 670 and, based on each similar work identified in step S51005 and the worker list corresponding to each similar work generated in step S51007, the CPU 501 stores corresponding contents in the columns of the work ID 670a, the work name 670b, the worker ID 670c, and the worker name 670d of this record.

Next, in step S51009, the CPU 501 sorts the worker information records acquired in step S51008 in ascending orders of the worker IDs and modification dates. Accordingly, when a worker information record of a certain worker and a next worker information record share a same worker ID, a period from a modification date of a certain worker information record to a modification date of a next worker information record can be identified as a validity period in which the worker had been in a state represented by the certain worker information record, but when a worker information record of a certain worker and a next worker information record have different worker IDs, a period from a modification date of a certain worker information record of the worker to the present can be identified as a validity period in which the worker had been in a state represented by the certain worker information record. In addition, with respect to each worker information record, the CPU 501 merges the pieces of similar work performance information acquired in step S51006 with a validity period of the worker information record as a tally period. Specifically, the CPU 501 stores an average value of a work time that is a difference between a work start time in the work start time 460c and a work end time in the work end time 460d of records of similar work performance information in each tally period as a work time in the work time 670e of the record created in step S51008, configures a ratio of records with "x" in the acceptance determination 460e in the records of similar work performance information in each tally period as a failure occurrence rate in the failure occurrence rate 670f, and configures a date portion of a work start time of a record with an oldest work start time in the work start time 460c in the records of similar work performance information in each tally period as a date indicated in the start date 670g.

Next, in step S51010, with respect to each record configured in step S51009, the CPU 501 configures values of the respective columns of the processing method 670h, the required accuracy 670i, the size 670j, the weight 670k, the processing area 6701, the level of complexity 670m, the "operation 1" 670n1, the number of times of operation 1 670n2, the "operation 2" 670n3, and the number of times of operation 2 670n4 based on process information corresponding to the work ID in the work ID 670a in the pieces of process information acquired in step S51003, and configures values of the age 670o, the gender 670p, the skill 1 level 670q1, the years of skill 1 experience 670q2, the skill 2 level 670q3, the years of skill 2 experience 670q4, the "qualification 1" 670r1, and the "qualification 2" 670r2 based on worker information corresponding to the worker ID in the worker ID 670c in the worker information acquired in step S51008.

Next, in step S51011, with the standard work time in the work time 670e and the failure occurrence rate in the failure occurrence rate 670f in the feature amount table 670 as target variables and the respective values (respective feature amounts) in the processing method 670h, the required accuracy 670i, the size 670j, the weight 670k, the processing area 6701, the level of complexity 670m, the "operation 1" 670n1, the number of times of operation 1 670n2, the "operation 2" 670n3, the number of times of operation 2 670n4, the age 670o, the gender 670p, the skill 1 level 670q1, the years of skill 1 experience 670q2, the skill 2 level 670q3, the years of skill 2 experience 670q4, the "qualification 1" 670r1, and the "qualification 2" 670r2 as explanatory variables, the CPU 501 identifies a feature amount with a high importance according to a method of feature selection. As the method of feature selection, for example, min-redundancy max-relevance (mRMR) can be used. Moreover, the method of feature selection is not limited thereto and other methods may be used. Since only a feature amount with a high importance is selected in this case, in generating a predictive model in a next step, a prediction accuracy of the generated predictive model can be maintained at a high level and, at the same time, processing load when generating the predictive model can be reduced.

Next, in step S51012, the CPU 501 generates a predictive model accommodating multiple target variables using the standard work time in the work time 670e and the failure occurrence rate in the failure occurrence rate 670f which are target variables and the feature amount selected in step S51011 among the explanatory variables. As a predictive model accommodating multiple target variables, for example, a predictive model using a neural network can be applied. Adopting a predictive model using a neural network enables the time required to estimate a work status using the predictive model to be reduced.

Next, in step S51013, the CPU 501 adds the worker information of the target worker acquired in step S51002 to the process information of the target work acquired in step S51001, estimates a standard work time and a failure occurrence rate with respect to each combination of target work and a target worker using the predictive model generated in step S51012, adds a record to the standard work time/failure occurrence rate DB 560, and configures corresponding contents to the respective columns (the work ID 560a, the work name 560b, the worker ID 560c, the worker name 560d, the estimated work time 560e, and the estimated failure occurrence rate 560f) of the record. Specifically, the CPU 501 configures the work ID of the target work to the work ID 560a, configures the work name of the target work to the work name 560b, configures the worker ID of the target worker to the worker ID 560c, configures the worker name of the target worker to the worker name 560d, configures the estimated standard work time to the estimated work time 560e, and configures the estimated failure occurrence rate to the estimated failure occurrence rate 560f. In addition, in accordance with the contents configured in the record of the standard work time/failure occurrence rate DB 560, the CPU 501 generates an estimation result table to be displayed in the estimation result display area 740 shown in FIG. 7 and causes the estimation result table to be displayed on the standard work time/failure occurrence rate estimate display screen 700. By referring to the estimation result table on the standard work time/failure occurrence rate estimate display screen 700, the apparatus user can readily and appropriately comprehend a standard work time and a failure occurrence rate which are expected when a target worker executes target work, which can be used as information for making a decision regarding which worker is to be allocated target work.

Next, the CPU 501 executes, for each target worker corresponding to the target work, a second loop process (steps S51015 and S51016).

In step S51015 of the second loop process, the CPU 501 identifies a similarity (for example, a value equal to or larger than 0 and equal to or smaller than 1, where the nearer to 1, the higher the similarity) between a target worker and a worker (a list worker) in the worker list generated in step S51007. In this case, when the list worker is the target worker, a similarity of 1 is assumed. On the other hand, when the list worker is not the target worker, a similarity between the target worker and the list worker is identified based on the worker information of the target worker and worker information corresponding to the list worker. In addition, when there are a plurality of records of worker information corresponding to a same list worker or, in other words, when there are records of a history of worker information of the list worker, a similarity is identified with respect to each of the records. As a method of identifying a similarity, for example, the similarity may be calculated using the k-nearest neighbor method or singular value decomposition. According to this process, a similarity between a target worker and a list worker at one or more certain time points can be appropriately identified.

Next, in step S51016, the CPU 501 calculates a product of the similarity (work similarity) between the target work and similar work identified in step S51005 and a similarity (worker similarity) between the target worker and a list worker at a certain time point identified in step S51015, identifies a combination of similar work and a worker at a certain time point which maximizes the product, and configures the work ID of the identified similar work, the similarity between the similar work and the target work, the worker ID of the similar worker, the similarity between the list worker and the target worker, and a time point corresponding to the state of the list worker to the similar work ID 560g, the work similarity 560h, the similar worker ID 560i, the worker similarity 560j, and the similar worker history update date 560k of the record written in the standard work time/failure occurrence rate DB 560 in step S51013.

Next, after executing the second loop process (steps S51015 and S51016) with respect to all target workers, the CPU 501 executes the first loop process (steps S51005 to S51016) with respect to other target work, and when the execution of the first loop process is completed with respect to all target work, the CPU 501 ends the standard work time/failure occurrence rate estimation process.

According to the process described above, since a predictive model for estimating a work status (a standard work time and a failure occurrence rate) of a target worker is created using work performance information, worker information and work information of work performed by another worker, a work status (a standard work time and a failure occurrence rate) with respect to work that has never been actually executed by the target worker can be appropriately estimated. In addition, since the predictive model is created using work performance information of only work with a high similarity to the target work, a processing load when creating the predictive model can be reduced and the work status of the target worker can be more accurately estimated.

Next, the worker candidate recommendation process will be described.

Figure 12:
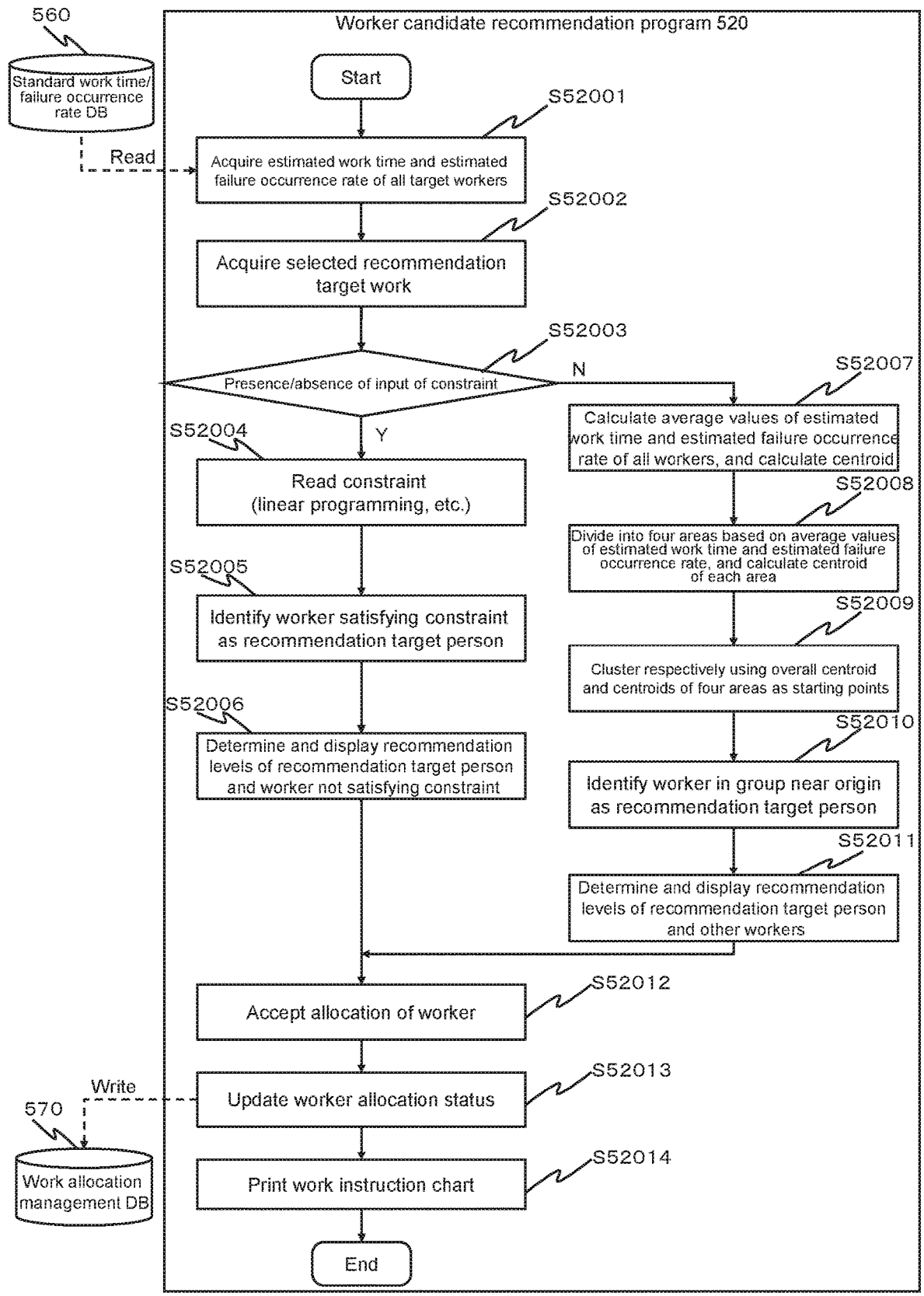
FIG. 12 is a flowchart of a worker candidate recommendation process according to an embodiment.

FIG. 12 is a flow chart of a worker candidate recommendation process according to an embodiment.

The worker candidate recommendation process is executed when the CPU 501 executes the worker candidate recommendation program 520. In the worker candidate recommendation process, the CPU 501 reads a result of the standard work time/failure occurrence rate estimation process from the standard work time/failure occurrence rate DB 560 and, based on the result, outputs a worker candidate to which work is to be allocated.

Next, the worker candidate recommendation process will be described in detail.

When an instruction to execute the worker candidate recommendation process is issued from the apparatus user after the standard work time/failure occurrence rate estimation process is performed, the CPU 501 causes the worker candidate recommendation screen (800 or 900) to be displayed on the display apparatus 506.

In step S52001, the CPU 501 collectively acquires, from the standard work time/failure occurrence rate DB 560, results of the standard work time/failure occurrence rate estimation process or, in other words, records of the standard work time/failure occurrence rate DB 560.

Next, in step S52002, on the worker candidate recommendation screen (800 or 900), the CPU 501 acquires information (a work name, a work ID, or the like) which identifies work (candidate output target work) for which a worker candidate selected by the apparatus user is to be recommended (output).

Next, in step S52003, the CPU 501 determines whether or not there is an input of a constraint in the constraint input area (820 or 920) of the worker candidate recommendation screen, and executes processes of steps S52004 to S52006 when it is determined that there is an input of a constraint (S52003: Y) but executes processes of steps S52007 to S52011 when it is determined that there is no input of a constraint (S52003: N).

In step S52004, the CPU 501 acquires all constraints input to the constraint input area.

Next, in step S52005, the CPU 501 refers to a record corresponding to the candidate output target work in the standard work time/failure occurrence rate DB 560 and identifies, as a recommendation target person, a worker of which the standard work time in the estimated work time 560*e* and the failure occurrence rate in the estimated failure occurrence rate 560*f* satisfy all of the constraints acquired in step S52004.

Next, in step S52006, the CPU 501 determines a recommendation level with respect to the recommendation target person and a worker not satisfying the constraints, generates a worker candidate list including a worker name, a standard work time, and a failure occurrence rate which can be acquired using each worker ID as a key, the determined recommendation level, and allocated work of the worker, causes the worker candidate list to be displayed in the worker candidate list display area 870 of the worker candidate recommendation screen 800, and makes a transition to step S52012. The recommendation level may be calculated by, for example, a prescribed calculation formula including a standard work time and/or a failure occurrence rate and may be calculated using, for example, a calculation formula expressed as "7−standard work time−failure occurrence rate×2" with a third constraint in the constraint input area 820 shown in FIG. 8 as a reference. Moreover, contents of the allocated work in the worker candidate list can be acquired from the work allocation management DB 570. Accordingly, a worker satisfying constraints can be appropriately selected and recommended.

On the other hand, when it is determined in step S52003 that there is no input of a constraint (S52003: N), in step S52007, the CPU 501 calculates an average value of the standard work time in the estimated work time 560*e* and an average value of the failure occurrence rate in the estimated failure occurrence rate 560*f* with respect to all of the records acquired in step S52001, and sets a point corresponding to the average value as a centroid 1.

Next, in step S52008, the CPU 501 divides data into four areas in a 2×2 pattern including a range larger and a range smaller than the average value of the standard work time and a range larger and a range smaller than the average value of the failure occurrence rate calculated in step S52007, calculates a centroid of each area in a similar manner to the calculation method of the centroid 1, and respectively sets the centroids of the respective areas as centroids 2 to 5.

Next, in step S52009, the CPU 501 performs clustering with respect to a plurality of workers respectively using the centroids 1 to 5 as starting points. As a method of clustering, for example, the k-means method can be used.

Next, in step S52010, the CPU 501 identifies, as a recommendation target person, a worker of a cluster most preferable as a worker to be allocated to work or, specifically, a cluster with a low failure occurrence rate and a short standard work time on the scatter diagram shown in FIG. 9 or, in other words, a cluster nearest to the origin (nearest to bottom left) among the five clusters (groups) having been clustered in step S52009. In this case, as a method of identifying the cluster nearest to the origin, for example, a cluster which minimizes a sum of a standard work time and a failure occurrence rate at the centroid of the cluster may be identified as the cluster nearest to the origin.

Next, in step S52011, the CPU 501 determines a recommendation level in accordance with a criterion designated in advance with respect to both the recommendation target person and workers other than the recommendation target person. For example, the recommendation level of a worker included in the cluster nearest to the origin may be set to 5, the recommendation level of a worker included in the cluster farthest from the origin (nearest to top right) may be set to 1, and the recommendation level of other workers may be set to 3. Next, the CPU 501 generates a worker candidate list including a worker name, a standard work time, and a failure occurrence rate which can be acquired using each worker ID as a key, the determined recommendation level, and allocated work of the worker and causes the worker candidate list to be displayed in the worker candidate list display area 970 of the worker candidate recommendation screen 900.

Accordingly, even when constraints are not configured, a worker suitable for work can be appropriately selected and recommended.

Next, in step S52012, in response to the allocation button (880 or 980) on the worker candidate recommendation screen (800 or 900) being pressed by the apparatus user, the CPU 501 accepts a designation of allocation by the apparatus user. Moreover, when the detail confirmation button (890 or 990) on the worker candidate recommendation screen (800 or 900) is pressed by the apparatus user, the CPU 501 displays the worker history confirmation screen 1000.

Next, in step S52013, in order to allocate the worker designated by the apparatus user in step S52012 to the target work, the CPU 501 adds and updates information of the allocated work in a record corresponding to the designated worker in the work allocation management DB 570.

Next, in step S52014, based on the records in the work allocation management DB 570, for each worker, the CPU 501 causes a prescribed printing apparatus to print a work instruction chart indicating work allocated to the worker and ends the process. Alternatively, the work instruction chart may be printed at a prescribed timing irrelevant to the worker candidate recommendation process.

It is to be understood that the present invention is not limited to the embodiment described above and that various modifications can be made in the invention without departing from the spirit and scope thereof.

For example, while the embodiment described above enables a work status of a target worker in target work to be estimated even when the target worker does not have experience in the target work and similar work that is similar to the target work and when a worker similar to the target worker does not have experience in the target work but has experience in similar work, even when the target worker has experience in the target work and a work history thereof is available, when the target worker does not have experience in the target work but has experience in similar work, and when the target worker does not have experience in the target work and similar work but a similar worker has experience in the target work, the work status of the target worker in the target work can be appropriately estimated by performing a similar process or by making a minor modification to the process described above. For example, while various processes (for example, steps S51003 and S51005) are performed with respect to work that differs from the target work in the standard work time/failure occurrence rate estimation process, the processes may also be performed with respect to the target work in addition to different work.

In addition, while each of the process information management DB 260, the worker information management DB 360, and the work performance information management DB 460 are managed by an apparatus that differs from the production management support apparatus 500 in the embodiment described above, the present invention is not limited thereto and, for example, at least any one of the process information management DB 260, the worker information management DB 360, and the work performance information management DB 460 may be managed by the production management support apparatus 500.

Furthermore, while the work allocation management DB 570 is managed by the production management support apparatus 500 in the embodiment described above, the present invention is not limited thereto and the work allocation management DB 570 may be managed by an apparatus that differs from the production management support apparatus 500.

In addition, while a standard work time and a failure occurrence rate are estimated as a work status of a target worker in the embodiment described above, the present invention is not limited thereto and only the standard work time or only the failure occurrence rate may be estimated.

Furthermore, a part of or all of the processes performed by the CPU in the embodiment described above may be performed by a hardware circuit. In addition, a program in the embodiment described above may be installed from a program source. The program source may be a program distribution server or a storage medium (for example, a portable storage medium).

What is claimed is:

1. A production management support apparatus that estimates a work status of a worker with respect to prescribed work, the production management support apparatus comprising:
    a communication interface configured to communicate with external apparatuses via a local area network;
    a user interface through which a user controls the production management support apparatus;
    a memory storing a program for execution in the production management support apparatus;
    a processor programmed to execute the program stored in the memory based on inputs received from the user via the user interface such that the processor executes:
        a process of acquiring, from a capability information storage unit arranged in a first external apparatus and storing capability information related to capabilities of a plurality of workers, the capability information;
        a process of acquiring, from a work information storage unit arranged in a second external apparatus and storing work information related to work contents of a plurality of kinds of work, the work information;
        a process of acquiring, from a work performance information storage unit arranged in a third external apparatus and storing work performance information including a work status of a plurality of kinds of work actually executed by the plurality of workers, the work performance information;
        an accepting process of accepting a designation of a target worker that is a worker for which a work status is estimated, and a designation of target work that is work for which the work status is estimated;
        a model generation process of generating a predictive model which adopts a work status in the work performance information of the plurality of kinds of work as a target variable, and which adopts any plurality of feature amounts among feature amounts included in the work information and the capability information as an explanatory variable;
        an estimation process of applying the predictive model to the capability information of the target worker and the work information of the target work, to estimate a work status when the target work is performed by the target worker; and
        a display process of displaying the estimated work status; and
    a display apparatus configured to display one of a plurality of worker information screens based on a screen selection input received from the user via the user interface, including the estimated work status.

2. The production management support apparatus according to claim 1, wherein
    the processor is configured to, in the model generation process, generate the predictive model by acquiring the work performance information regarding a part of work with a high similarity to the target work accepted in the accepting process among the plurality of kinds of work.

3. The production management support apparatus according to claim 1, wherein
the processor is configured to, in the model generation process, identify a part of feature amounts with a high degree of influence on the target variable among feature amounts included in the work information and in the capability information, and generate the predictive model adopting the identified feature amounts as the explanatory variable.

4. The production management support apparatus according to claim 1, wherein
the work status includes a standard work time required by a worker to execute the work.

5. The production management support apparatus according to claim 4, wherein
the work status further includes a failure occurrence rate when the work is executed by a worker.

6. The production management support apparatus according to claim 1, wherein
the predictive model is constituted by a neural network.

7. The production management support apparatus according to claim 1, wherein
the processor is configured to further execute:
a process of storing the estimated work status in association with the target worker and the target work in a storage apparatus;
a process of accepting candidate output target work that is work for which a worker candidate is to be output;
a selecting process of selecting, based on the work status corresponding to the candidate output target work and stored in the storage apparatus, a worker to be a candidate to be allocated to the candidate output target work; and
a process of outputting information on the selected worker to be a candidate.

8. The production management support apparatus according to claim 7, wherein
the processor is configured to further execute:
a process of accepting a constraint related to a work status with respect to a worker to be allocated to the candidate output target work; and
in the selecting process, select a worker satisfying the constraint as the candidate to be allocated to the candidate output target work.

9. The production management support apparatus according to claim 7, wherein
the processor is configured to further execute:
a process of dividing the plurality of workers into a plurality of clusters based on the work status stored in the storage apparatus and corresponding to the candidate output target work; and
in the selecting process, select a worker belonging to an optimum cluster with respect to the work status among the plurality of clusters, as the candidate to be allocated to the candidate output target work.

10. The production management support apparatus according to claim 7, wherein
the processor is configured to further execute:
a process of accepting a designation of a worker to be allocated to the candidate output target work from the selected workers; and
a process of registering, to a prescribed storage apparatus, allocation information indicating that the candidate output target work has been allocated to the worker for which the designation has been accepted.

11. The production management support apparatus according to claim 10, wherein
the processor is configured to further execute a process of causing, based on the allocation information, a prescribed printing apparatus to output a work instruction chart indicating work allocated to each worker.

12. A production management support method executed by a production management support apparatus that estimates a work status of a worker with respect to prescribed work, the production management support apparatus including a communication interface configured to communicate with external apparatuses via a local area network, a user interface through which a user controls the production management support apparatus, a memory storing a program for execution in the production management support apparatus, a processor programmed to execute the program stored in the memory based on inputs received from the user via the user interface, the method comprising:
a process of acquiring, from a capability information storage unit arranged in a first external apparatus and storing capability information related to capabilities of a plurality of workers, the capability information;
a process of acquiring, from a work information storage unit arranged in a second external apparatus and storing work information related to work contents of a plurality of kinds of work, the work information;
a process of acquiring, from a work performance information storage unit arranged in a third external apparatus and storing work performance information including a work status of a plurality of kinds of work actually executed by the plurality of workers, the work performance information;
a process of accepting a designation of a target worker that is a worker for which a work status is estimated, and a designation of target work that is work for which the work status is estimated;
a model generation process of acquiring the work performance information of the plurality of workers related to the plurality of kinds of work, and generating a predictive model which adopts a work status in the work performance information of each work as a target variable, and which adopts any plurality of feature amounts among feature amounts included in the work information and the capability information as an explanatory variable;
an estimation process of applying the predictive model to the capability information of the target worker and the work information of the target work, to estimate a work status when the target work is performed by the target worker; and
a display process of displaying one of a plurality of worker information screens based on a screen selection input received from the user via the user interface, including the estimated work status.

13. A non-transitory computer readable medium storing a production management support program to be executed by a computer constituting a production management support apparatus that estimates a work status of a worker with respect to prescribed work, the production management support apparatus including a communication interface configured to communicate with external apparatuses via a local area network, a user interface through which a user controls the production management support apparatus, a memory storing a program for execution in the production management support apparatus, a processor programmed to execute the program stored in the memory based on inputs received from the user via the user interface, the program causing the computer to execute:

a process of acquiring, from a capability information storage unit arranged in a first external apparatus and storing capability information related to capabilities of a plurality of workers, the capability information;

a process of acquiring, from a work information storage unit arranged in a second external apparatus and storing work information related to work contents of a plurality of kinds of work, the work information;

a process of acquiring, from a work performance information storage unit arranged in a third external apparatus and storing work performance information including a work status of a plurality of kinds of work actually executed by the plurality of workers, the work performance information;

a process of accepting a designation of a target worker that is a worker for which a work status is estimated, and a designation of target work that is work for which the work status is estimated;

a model generation process of generating a predictive model which adopts a work status in the work performance information of the plurality of kinds of work as a target variable, and which adopts any plurality of feature amounts among feature amounts included in the work information and the capability information as an explanatory variable;

an estimation process of applying the predictive model to the capability information of the target worker and the work information of the target work, to estimate a work status when the target work is performed by the target worker; and a display process of displaying one of a plurality of worker information screens based on a screen selection input received from the user via the user interface, including the estimated work status.

* * * * *